United States Patent
Eppler et al.

(10) Patent No.: US 8,169,119 B2
(45) Date of Patent: May 1, 2012

(54) ELECTRIC MACHINE HAVING SLOT INSULATION WITH FLANGE ARRANGEMENT

(75) Inventors: Willi Eppler, Ratshausen (DE); Ullrich Kreiensen, Deisslingen (DE); Jurgen Schill, Bad Durrheim (DE)

(73) Assignee: Minebea, Co., Ltd, Nagano (JP)

( * ) Notice: Subject to any disclaimer, the term of this patent is extended or adjusted under 35 U.S.C. 154(b) by 396 days.

(21) Appl. No.: 12/389,205

(22) Filed: Feb. 19, 2009

(65) Prior Publication Data

US 2009/0224626 A1    Sep. 10, 2009

(30) Foreign Application Priority Data

Mar. 5, 2008  (DE) .......................... 10 2008 012 680
Dec. 19, 2008  (DE) .......................... 10 2008 064 132

(51) Int. Cl.
*H02K 3/34*   (2006.01)
*H02K 23/40*  (2006.01)
*H02K 3/48*   (2006.01)

(52) U.S. Cl. .................... 310/215; 310/194; 310/214

(58) Field of Classification Search .............. 310/71, 310/214, 215, 418, 194
See application file for complete search history.

(56) References Cited

U.S. PATENT DOCUMENTS

| | | | |
|---|---|---|---|
| 4,818,911 A * | 4/1989 | Taguchi et al. | 310/216.105 |
| 569,892 A | 12/1997 | Coupart | |
| 7,752,733 B1 * | 7/2010 | Badgerow | 29/596 |
| 2003/0160532 A1 * | 8/2003 | Suzuki et al. | 310/218 |
| 2004/0195926 A1 * | 10/2004 | Hiwaki et al. | 310/216 |
| 2006/0082242 A1 * | 4/2006 | Schill | 310/217 |
| 2006/0181173 A1 * | 8/2006 | Takahashi et al. | 310/216 |
| 2007/0001525 A1 * | 1/2007 | Schneider et al. | 310/71 |
| 2007/0040456 A1 * | 2/2007 | Hansen et al. | 310/14 |
| 2009/0224617 A1 | 9/2009 | Bottger et al. | |
| 2009/0224626 A1 | 9/2009 | Eppler et al. | |

FOREIGN PATENT DOCUMENTS

| | | |
|---|---|---|
| DE | 102005024739 A1 | 12/2006 |
| DE | 10 2008 012 680 A1 | 9/2009 |
| DE | 10 2008 064 131 A1 | 9/2009 |
| DE | 10 2008 064 132 A1 | 9/2009 |
| JP | 06153432 A * | 5/1994 |
| JP | 2009213348 A | 9/2009 |
| JP | 2009213349 A | 9/2009 |

OTHER PUBLICATIONS

MAchine Translation JP06153432 (1994).*

* cited by examiner

*Primary Examiner* — Quyen Leung
*Assistant Examiner* — Jose Gonzalez Quinones
(74) *Attorney, Agent, or Firm* — Duane Morris, LLP

(57) ABSTRACT

An electric machine having a rotor and a stator that encloses the rotor. The stator is closed at its end faces by flanges. A slot insulation is applied in an axial direction to the stator and has means of centering the rotor and/or the flanges with respect to the stator.

24 Claims, 11 Drawing Sheets

ELECTRIC MACHINE HAVING SLOT INSULATION WITH FLANGE ARRANGEMENT

The instant application claims the priority benefit of German Patent Application No. 10 2008 012 680.2, filed on Mar. 5, 2008 and German Patent Application No. 10 2008 064 132.4 filed on Dec. 19, 2008, which claims priority to German Patent Application No. 10 2008 064 611.3 filed on Mar. 5, 2008, the entirety of each are hereby incorporated by reference.

The instant application is related to co-pending U.S. patent application Ser. No. 12/389,205, entitled, "Electric Machine," filed on Feb. 19, 2009, the entirety of which is incorporated by reference.

FIELD OF THE INVENTION

The invention relates to an electric machine that has a rotor and a stator and at least one flange arrangement that is disposed at an end face of the stator.

BACKGROUND OF THE INVENTION

A preferred field of application of the invention is in brushless dc motors and stepper motors as well as other permanent magnet motors that are configured as inner rotor motors. Inner rotor motors comprise a rotor arrangement that is mounted on a shaft and inserted coaxially into a stator arrangement. The stator body is generally made up of stamped metal laminations that carry windings. It comprises a back yoke ring on whose inner surface lie stator slots and stator poles that receive the stator winding.

In the prior art, electric machines are generally built with metal housings and mounting flanges that are disposed on one or both end faces of the housing. First, the stator is constructed as an assembly in that the stator body is built up to form, for example, a stamped lamination stack and is then wound. The rotor assembly is inserted into the stator, and the stator is fixed to the motor housing at the two mounting flanges using suitable means such as bonding, screwing, riveting, caulking, welding etc. This kind of technique is also described in DE 695 02 496 T2 as discussed below.

In small electric motors, the available installation space is frequently limited so that the known methods of attaching the mounting flange on the motor housing either increase the size of the motor and, where installation space is limited, may no longer be an option, or the necessary process technology for assembly is complex and entails considerably more work and expense in production. What is more, conventional motor housings are not optimized for cooling the stator when in operation. The dissipation of heat to the environment simply takes place via the metal housing without any special arrangements being made for heat removal.

It is also known to totally dispense with an additional motor housing and to release the heat generated during operation directly from the stator surface into the environment. This is described, for example, in DE 10 2004 050 373 A1 as explained below.

DE 695 02 496 T2 describes a slotted stator for an electric machine that is made up of a plurality of stator laminations that are joined to form a lamination stack. This lamination stack forms a back yoke ring on whose inside surface lie stator slots and stator poles that receive the stator winding. The outside contour of the laminations takes the form of a regular polygon, preferably a rectangle whose edges are flattened to form a circular contour. The individual laminations are disposed at an angular offset with respect to one another such that, in projection, the flattened edges of the polygon complement one another to form a circle. In this way, the outside surface of the stator, and thus the exchange surface for dissipating heat to the environment, is made larger.

In DE 695 02 496 T2 the stator is disposed in a housing that has channels for conducting a cooling medium, such as air, between the inside surface of the housing and the outside surface of the stator, in order to cool the stator. This construction requires quite a lot of space and the special design of the housing including cooling channels is complex.

DE 10 2004 050 373 A1 describes a stator arrangement for an electric machine that is configured as an inner rotor motor, the stator having a back yoke ring and stator poles and stator slots formed on the inside surface of the back yoke ring. In order to insulate the stator poles with respect to the stator winding, an insulating coating is applied to the stator poles and stator slots. The insulating coating is injected onto the stator body such that the outside surface of the back yoke ring remains free of coating. A housing body is molded onto the stator, the housing body comprising two end-face housing sections. The bottom of the stator slots and the side surfaces of the stator poles are fully coated. The two end-face housing sections are aligned flush to the outside surface of the back yoke ring and directly adjoin this surface in order to form a sealed unit closed to the outside so that a separate housing need not be provided. The two end-face housing sections may each be connected to a flange. This goes to produce an electric machine having an extremely compact construction, which, however, in terms of cooling the stator is less favorable than the machine described initially.

It is an object of the invention to provide an electric machine that can be easily manufactured at low cost and that has good properties in terms of heat dissipation of the stator.

SUMMARY OF THE INVENTION

The invention provides an electric machine having a rotor and a stator, where the stator encloses the rotor and slot insulation is applied to the stator. A flange arrangement is disposed on at least one end face of the stator. According to the invention, the slot insulation has means for centering the rotor and/or the flange arrangement with respect to the stator.

In a preferred embodiment of the invention, the flange arrangement directly adjoins the end face of the stator and, together with the outside circumference of the stator, forms the motor housing. The flange arrangement, however, is not centered, or not solely centered, by the outside circumference of the stator, but rather, according to the invention, by the slot insulation. For its part, the rotor is centered via the flange arrangement or using the slot insulation. This goes to produce a motor design in which the outside circumference of the stator forms part of the motor housing and is thus not enclosed in a separate housing, resulting in an improvement in the heat dissipation of the motor to the environment. By centering the rotor and/or the flange arrangement using the slot insulation—and not via a motor housing or the outside circumference of the stator—the tolerance chain between the rotor, the stator and the flange arrangement can be made shorter.

A bearing support for a rotor bearing may be integrated into the slot insulation, or the slot insulation may have means of centering a bearing support. The bearing support for the rotor arrangement may also be provided in the flange arrangement.

In an advantageous embodiment of the invention, the slot insulation is formed with a circumferential surface against which the second flange arrangement comes to lie. The flange arrangement can, for example, be cup-shaped in form and encompass the slot insulation, so that the inside wall of the cup comes to lie against the circumferential surface of the slot insulation.

In one embodiment of the invention, the slot insulation has pins for its attachment to the flange arrangement. These pins can be formed, for example, for the purpose of hot caulking the flange arrangement to the slot insulation.

As an alternative or in addition, a step may be formed on the outside circumference of the stator on which the flange arrangement is placed. The flange arrangement is then centered by both the circumferential surface of the slot insulation as well as the step, and additionally by the above-mentioned pins, where applicable. In addition or as an alternative to their connection by hot caulking the pins, the stator and the flange arrangement can also be connected to each other by means of welding, particularly laser welding, or by bonding.

In a further modification of the described embodiments, the slot insulation also has means of centering a printed circuit board at the end face of the stator. The slot insulation and the printed circuit board may be connected to each other, for example, using snap-in fasteners or connecting pins.

In a further embodiment of the invention, the flange arrangement comprises a first flange component at one or both end faces of the electric machine, the first flange component having a connecting surface which adjoins the end face of the stator and whose geometry is adapted to the geometry of the end surface of the stator. This makes it possible for a stator winding, which is wound on the stator, to be also wound over the adjoining connecting surface of the flange component, in order to connect the stator and the flange component to each other with the aid of the stator winding. The stator and flange arrangement may be connected to each other using solely the stator winding, or additional securing means, such as an adhesive or a plug-in connector, may be provided.

The first flange component is preferably cup-shaped and the connecting surface forms the bottom of the cup. A second flange component can be connected to the cup-shaped first flange component, the second flange component taking the form of a cover for the first flange component. The second flange component, or the first flange component, preferably includes a bearing support for receiving a shaft bearing. This bearing support can be integrally formed with the flange component as one piece or held in the flange component.

In this embodiment of the invention, the slot insulation is applied to the stator such that the connecting surface of the first flange component comes to lie between the slot insulation and the end face of the stator. The slot insulation is slid over the stator and the adjoining connecting surface before the stator winding is mounted. The slot insulation has means for centering the flange and/or the bearing support.

Flange arrangements are preferably provided at both end faces of the stator that may be constructed according to one and the same embodiment or according to different embodiments. The outside circumference of the flanges thus formed is aligned substantially flush to the outside circumference of the stator.

In the preferred embodiment of the invention, the stator comprises a back yoke ring and stator slots and stator poles that are formed at the inside circumference of the back yoke ring and which receive the stator winding. If respective flange arrangements are provided at both end faces of the stator, they form the housing of the electric machine together with the back yoke ring.

Using the construction of the electric machine according to the invention, the problem of connecting flange and stator is solved in that the flanges are centered to the stator via the slot insulation without the need for a separate housing that carries the flanges. The flange arrangement only needs a connecting surface that is aligned flush with the end face of the stator and centered using the slot insulation. The stator and flange may also be connected to each other using the slot insulation. In addition, the stator and flange may be welded together at one or both end faces of the machine. Alternatively, the stator winding may be used to connect the stator and flange.

The construction according to the invention makes it possible not only to center and connect the flange to the stator in a space-saving way without using complex process technology, but also to realize a motor design in which the outside surface of the stator remains free since a separate housing for fixing the flanges is not necessary. This allows the heat generated during operation to be dissipated directly from the outside surface of the stator to the environment.

In a further aspect of the invention, the stator is made up of a plurality of stator laminations that are joined to form a lamination stack, protrusions being formed on the outside circumference of the individual stator laminations and the stator laminations being disposed at an angular offset with respect to one another in order to increase the size of the outside surface of the stator compared to a perfectly cylindrical outside surface.

At the outside circumference of the stator laminations (P/n) protrusions are preferably formed and the individual stator laminations are offset by an angle (360°/P)·m with respect to one another, where P is the number of stator poles and n and m are whole numbers greater than 0. The protrusions are preferably disposed such that they additionally increase the size of the magnetic back yoke. For this purpose, the protrusions bridge at least one stator slot between two adjacent poles; this means that a protrusion preferably extends from the radial extension of the central axis of a stator pole to the radial extension of the central axis of an adjacent pole. The protrusions may also bridge two or more stator slots.

In a particularly preferred embodiment, the protrusions take the form of segments of a circle that adjoin the cylindrical outside circumference of the stator laminations. When several stator laminations are disposed at an angular offset with respect to one another, these circular segments in turn preferably complement each other to form an essentially cylindrical shape, channels being formed between the individual aligned circular segments.

Through the special design of the outside surface of the stator, which forms part of the housing of the electric machine, the sleeve surface of the housing can be made significantly larger. The outside contour of the stator laminations can be designed such that quasi "cooling fins" are formed that result in a five to tenfold increase in the surface of the outside surface of the stator.

The various aspects of the invention achieve the object underlying the invention and may be applied individually or in any combination.

BRIEF DESCRIPTION OF DRAWINGS

The invention is described in more detail below on the basis of a preferred embodiment with reference to the drawings.

DETAILED DESCRIPTION OF EMBODIMENTS

Figure 1:
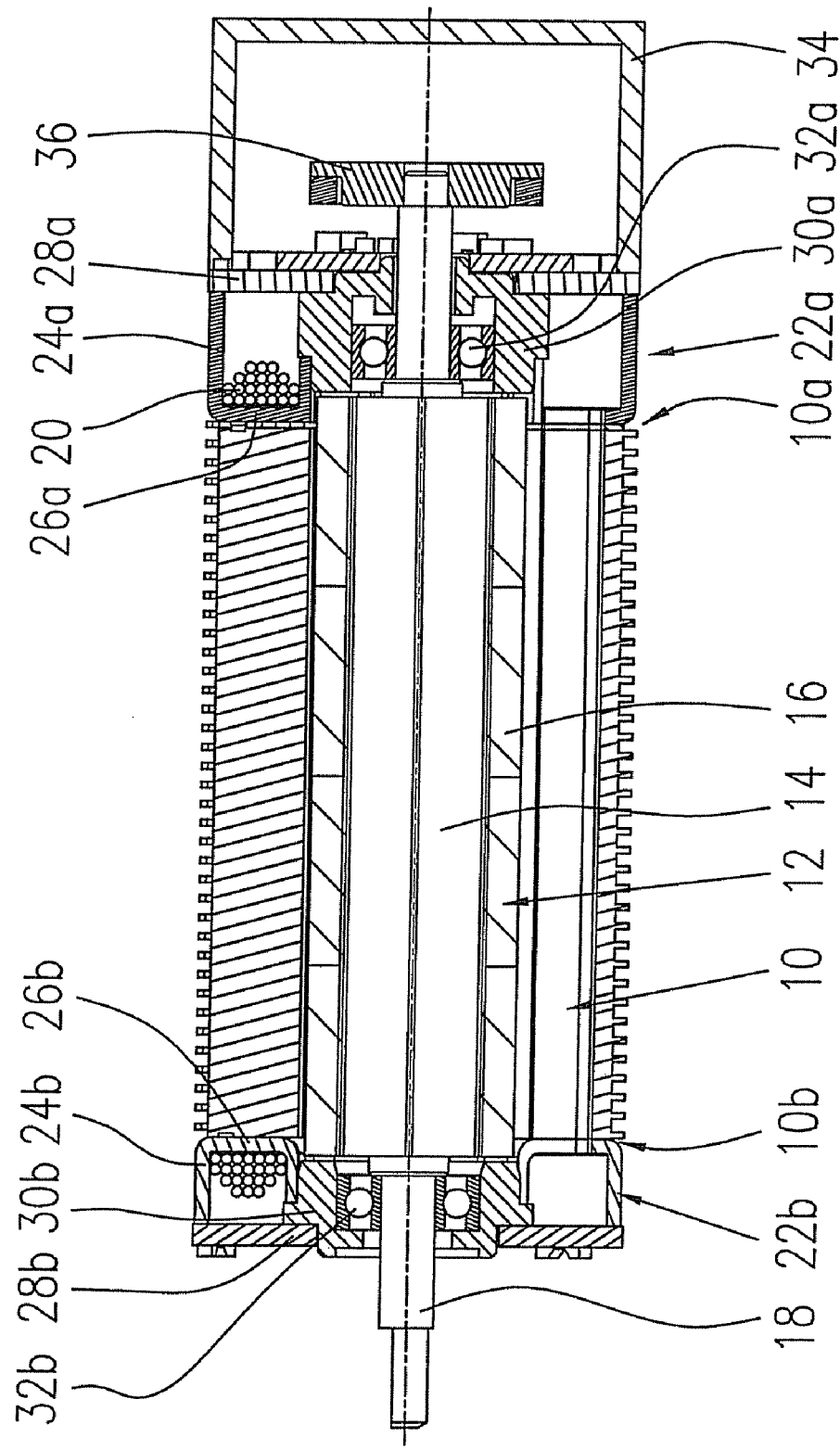
FIG. 1 shows a sectioned view through an electric machine for the purpose of explaining certain aspects of the invention.

FIG. 1 shows a sectioned view through a brushless dc motor that acts as a basis for the invention. The motor comprises a stator 10 and a rotor 12 and a rotor 12 that is enclosed by the stator. The rotor 12 comprises a magnet carrier 14 as well as permanent magnets 16 that are mounted on a shaft 18. The magnet carrier 14 may be made of a ferromagnetic material in order to form a back yoke for the permanent magnets 16.

The stator 10 comprises a back yoke ring and stator slots and stator poles that are formed on the inside circumference of the back yoke ring and which receive a stator winding 20. The stator 10 is made up of a plurality of stator laminations that are joined to form a lamination stack, as described in more detail below.

Figure 2:
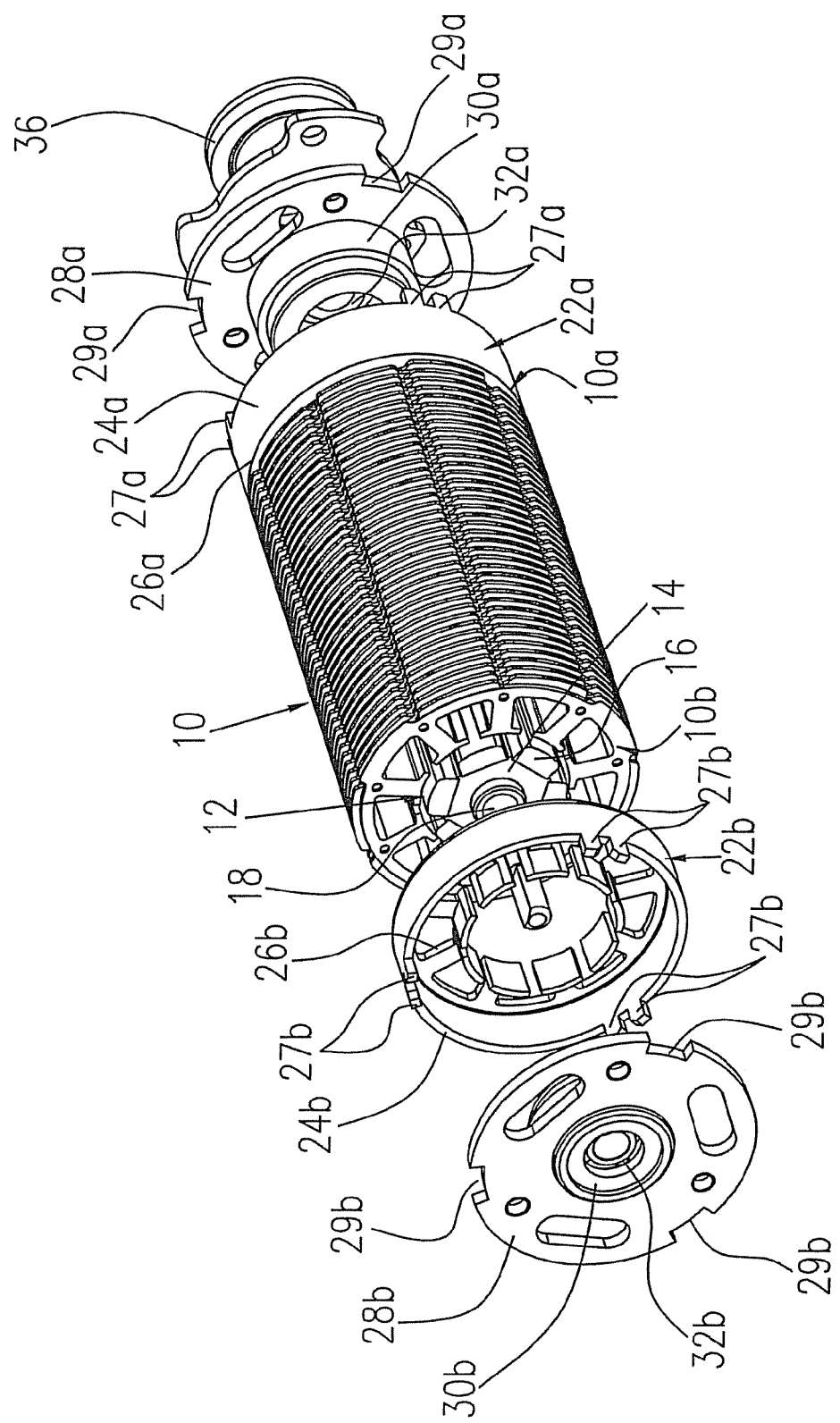
FIG. 2 shows an exploded view of the electric machine of FIG. 1.

At each end face of the stator 10a and 10b, a flange arrangement 22a, 22b is connected to the stator 10. Each flange arrangement 22a, 22b comprises a first flange component 24a, 24b that is cup-shaped in form. The geometry of the cup bottom 26a, 26b is adapted to the geometry of the end surface of the stator. This means that the geometry of the cup bottoms 26a, 26b is adapted to the lamination blanks of the stator, having stator poles and stator slots as shown in FIG. 2, to the extent that, when the stator 10 is wound, it is also possible to wind the stator winding 20 over the cup bottom 26a, 26b as well, thus fixedly connecting the first flange components 24a, 24b to the stator 10. The geometry of the cup bottoms 26a, 26b can, but need not, largely conform to the lamination blank of the stator.

The first flange components 24a, 24b are each closed by second flange components 28a, 28b. In the illustrated embodiment, these second flange components 28a, 28b are designed as simple disk-shaped covers. They each hold a bearing support 30a, 30b for receiving ball bearings 32a, 32b for supporting the shaft 18. The second flange components 28a, 28b can be connected to the first flange components 24a, 24b by caulking or in some other way.

In the illustrated embodiment, a sensor cover 34 adjoins the end face of the first flange arrangement 22a, a sensor magnet 36 that is connected to the shaft 18 being disposed in the sensor cover 34.

The electric machine according to the invention is designed such that the housing of the machine is formed by the two-piece flange arrangement 22a, 22b and the outside surface of the stator 10, so that a separate housing is not needed. The flanges 22a, 22b directly adjoin the stator 10. The flange components can be made, for example, as deep drawn parts or as punched bent parts, the cup bottoms 26a, 26b reproducing the geometry at the end surface of the stator. Before the stator 10 is wound, the first flange components 24a, 24b are disposed on the two end faces 10a, 10b of the stator and then wound and perhaps trickle impregnated. In this way, an assembly is realized in which the flanges are fixedly connected to the stator by the stator winding without requiring any additional connecting elements. The second flange components 28a, 28b can subsequently be inserted into the first flange components 24a, 24b. The second flange components 28a, 28b can be simply made, for example, from a stamped plate and caulking to the first flange components 24a, 24b or connected in some other way.

FIG. 2 shows an exploded view of the motor according to the invention by means of which the assembly of the motor in relation to the flange arrangement 22b is represented. The same applies to flange arrangement 22a accordingly. The cup bottom 26b of the first flange component 24b corresponds in its geometry to the end surface 10b of the stator 10. The first flange component 24b is placed on the stator and wound together with the stator. The projections 27b at the circumference of the first flange component 24b pointing in an axial direction are used to connect the first flange component to the second flange component 28b. They lie opposite to corresponding recesses, 29b in the second flange component 28b and are connected to the second flange component 28b by caulking. Shown are three recesses 29b and three projections 27b, each of which consists of two noses, whereby it is possible to have a different number of projections and projections of a different shape, and more generally a different kind of connection for the flange parts.

The bearing support 30b that carries the ball bearing 32b is inserted into the second flange component 28b. When the second flange component 28b is connected to the first flange component 24b, by caulking the flange arrangement 22b for example, the bearing support 30b is centered through its contact with the cup bottom 26b. According to the invention, the bearing support 30b is centered with the aid of slot insulation that is applied to the stator. Slot insulation of this kind can be injected onto the stator or slid onto the stator as a separate component (not illustrated). It comes to lie between the end face of the stator and the bottom of the first flange component and is fixed to the stator together with the flange arrangement by the winding. According to the invention, the slot insulation can be molded with some means of centering the bearing support.

Moreover, it is possible to extend the first flange component 24b in an axial direction and thus make the space between the cup bottom 26b and the second flange component larger. This space within the flange arrangement 22b may be used, for example, for receiving a fan wheel for cooling the motor.

Embodiments of the invention in which the slot insulation has means of centering the rotor and/or the flange arrangement with respect to the stator and the rotor are described below with reference to FIGS. 3 to 11.

Figure 3:
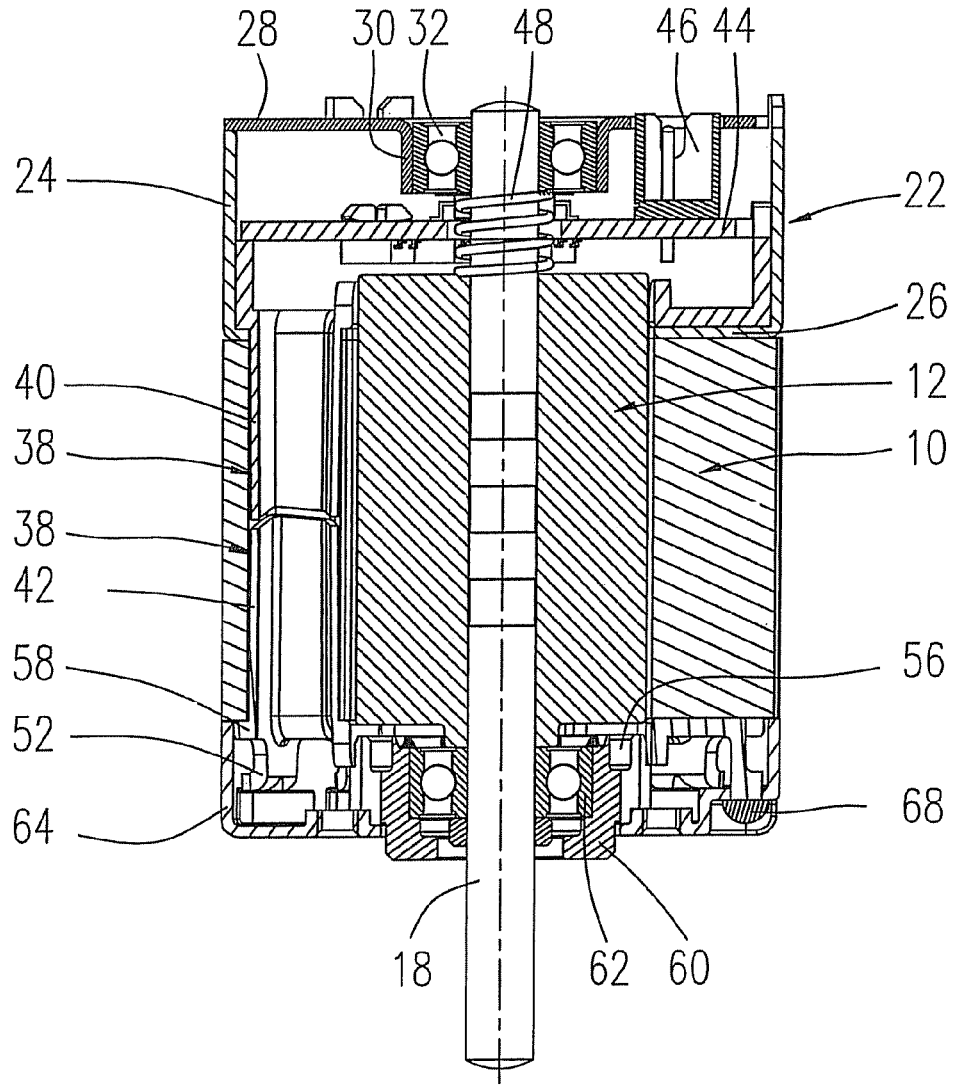
FIG. 3 shows a sectioned view through an electric machine according to one embodiment of the invention.
Figure 4:
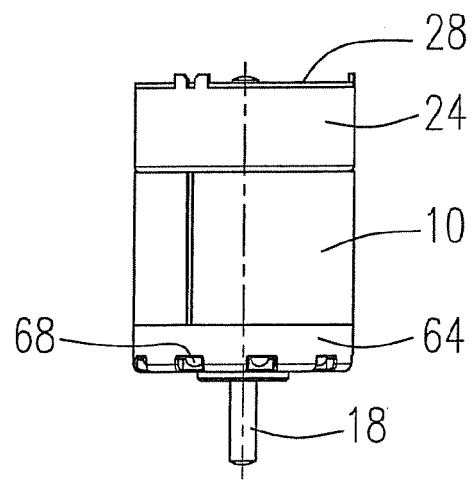
FIG. 4 shows a side view of the electric machine of FIG. 3.
Figure 5:
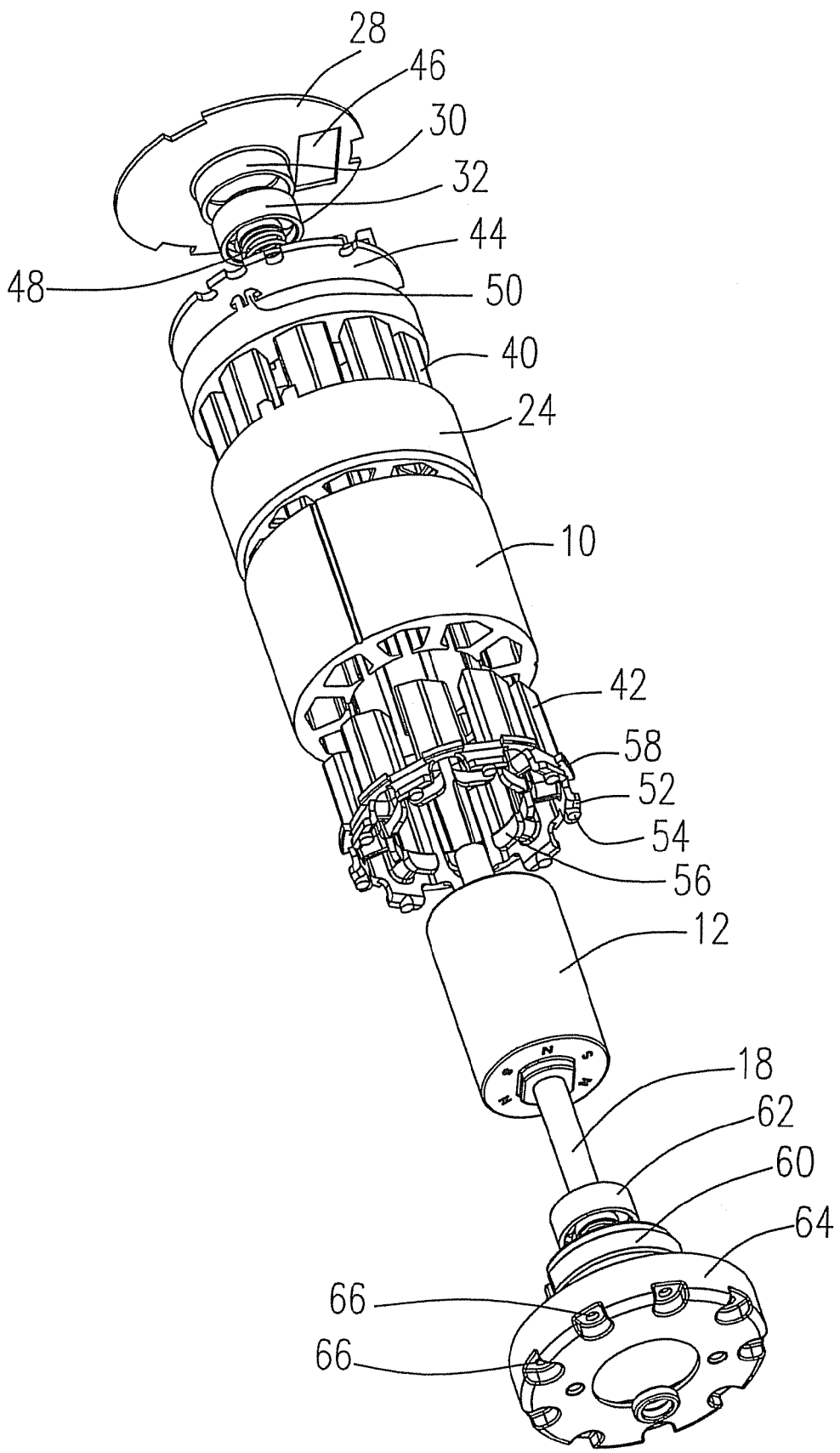
FIG. 5 shows an exploded view of the electric machine of FIG. 3.

A first variant of an embodiment is shown in FIGS. 3 to 5. In this embodiment, the first flange arrangement is connected to the stator at one end face of the electric machine in a similar way as described with reference to FIG. 1, whereas at the other end face of the electric machine, a second flange arrangement having a different kind of centering and connection for the flange and stator is provided.

The electric machine shown in FIGS. 3 to 5 comprises a stator 10 and a rotor 12 that is enclosed by the stator 10. A first flange arrangement 22 is provided at an end face of the stator 10 that is constructed in a similar way as in the previously described embodiment. The first flange arrangement 22 comprises a first flange component 24 that is cup-shaped in form. The geometry of the cup bottom 26 is adapted to the geometry of the end surface of the stator, so that when the stator 10 is wound, the stator winding (not illustrated in FIG. 3) can also be wound over the cup bottom 26, thus connecting the first flange component 24 to the stator 10.

The first flange component 24 is closed by a second flange component 28. In the illustrated embodiment, a bearing support 30 is integrated into the second flange component 28. The bearing support 30 holds a ball bearing 32 for supporting the shaft 18. The second flange component 28 can be connected to the first flange component 24 by caulking, welding or in some other way.

Before the stator is wound, slot insulation is applied to the stator which, in the illustrated embodiment, comprises two insulation members 40, 42. Insulation member 40 is associated with the end face of the stator 10 having the cup-shaped flange arrangement 22. The slot insulation is made of plastics and is preferably an injection-molded plastic part that is formed such that it is slid in an axial direction into the stator 10 and inserted into the slots of the stator.

When, in the embodiment of FIG. 3, the electric machine is assembled, first the cup-shaped flange component 24 is aligned to the end face of the stator 10, and then the insulation member 40 is slid on in an axial direction so that it engages in the slots of the stator 10 and centers and fixes the flange component 24 with respect to the stator. Through the subsequent winding of the stator, as described with reference to FIG. 1, the flange component 24 is fixedly connected to the stator 10.

Alongside a very simple assembly process, the construction according to the invention makes it also possible for the rotor 12 to be easily and precisely centered because the positioning and centering of the ball bearings 32a, 32b using the flange arrangements 22a, 22b is directly aligned to the inside diameter of the stator 10. Compared to the arrangement of bearing supports in flanges that are connected to a housing, this method goes to shorten the tolerance chain from the stator to the rotor. This goes to reduce the requirements placed on the concentricity of the flange arrangement 22, 22a, 22b or provides the potential for reducing the air gap between the stator and the rotor. Despite the compact construction of the electric machine, this makes it possible to increase performance.

In the embodiment of FIGS. 3 to 5, the insulation member 40 has means of centering and fixing a circuit board 44 that carries the components for the control and supply of the electric machine. The connection between the insulation member 40 and the circuit board 44 can be realized, for example, using snap-in fasteners 50, such as clips.

A recess 46 is formed in the second flange component 28 in which a socket for connecting the electric machine to signal and supply lines may be provided.

The inner race of the ball bearing 32 is preloaded using a spring 48. In the embodiment of FIG. 3, the rotor 12 is extended in an axial direction with respect to the stator 10 and delivers an axial magnetic leakage field to a magnetic sensor, such as a Hall sensor that is provided on the circuit board 44, in order to measure the rotational position, rotational direction and/or rotational speed of the electric machine.

In the embodiment of FIGS. 3 to 5, the insulation member 40 of the slot insulation at one end face of the electric machine is used not only for centering the flange 22 but also for centering the circuit board 44 and, via the flange 22, also for centering the ball bearing 32 for supporting the rotor 12.

Using the slot insulation, the rotor is thus centered with reference to the inside circumference of the stator and not, as is usual in the prior art, with respect to the outside circumference of the stator or with respect to a housing, so that the tolerance chain from the stator to the rotor can be made shorter.

In the embodiment of FIGS. 3 to 5, a second flange arrangement is provided on the drive side of the electric machine, the second flange arrangement having a different method of centering and fixing the flange. The insulation member 42 of the slot insulation is also inserted at this end face of the electric machine in an axial direction into the slots of the stator 10. Wire guides 52 are molded onto the insulation member 42 from which connecting pins 54 project in an axial direction that are used to connect the insulation member 42 to the flange, as described below.

Furthermore, the insulation member 42 has projections 56 extending inwards in a radial direction for centering a bearing support as well as projections 58 extending outwards in a radial direction for centering the flange. A bearing support 60 comes to lie against the projections 56 and receives a ball bearing 62 for supporting the shaft 18 and thus the rotor 12. Since the insulation member 42 is fitted into the stator 10 and thus aligned with respect to the stator, the rotor 12 can then be directly centered and positioned with respect to the stator with the aid of the slot insulation.

A flange component 64 is slid from the end face in an axial direction over the insulation member 42, so that the connecting pins 54 of the insulation member 42 come to lie in appropriate holes 66 in the flange component 64. In this way, the flange component 64 is centered with respect to the insulation member 42 and thus with respect to the stator and the rotor. In the preferred embodiment, the connecting pins 54 are moreover designed such that they jut out of the holes 66 so that the slot insulation can be connected to the flange component 64 by hot caulking the connecting pins 54. Domes 68 are thereby formed on the free ends of the connecting pins 54, which ensure a long-lasting connection of the flange component 64 to the insulation member 42 and thus to the electric machine. The domes 68 can best be seen in FIG. 3.

As shown in FIG. 4, the described arrangement produces an electric machine whose housing is formed by the outside circumference of the stator 10 as well as the outside surfaces of the flange components 24 and 64. The slot insulation lies fully within these components and more or less forms the skeleton of the electric machine.

The design of the second flange arrangement at the drive side of the electric machine of FIG. 3 has the advantage over the first flange arrangement described at the outset that, even after the stator has been wound, the interior of the electric machine is still accessible, thus making it easier to connect the winding wires since the second flange arrangement is mounted in a subsequent operation independent of the winding. The second flange arrangement is integrally formed as one piece and the centering and connection of the second flange arrangement using the slot insulation is simple and easily realized. The described method of connection using the connecting pins is particularly suitable for short connections in which there is no need to accommodate a circuit board or any other components within the flange, as is the case at the opposite end face of the electric machine.

Figure 6:
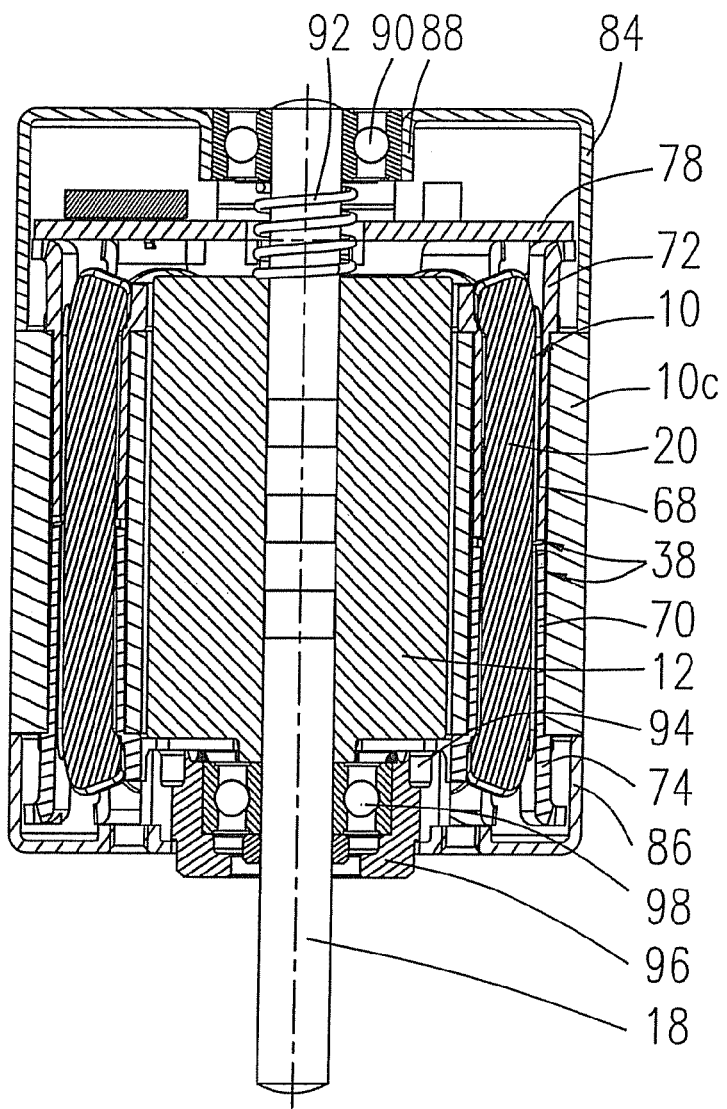
FIG. 6 shows a sectioned view through an electric machine according to another embodiment of the invention.
Figure 7:
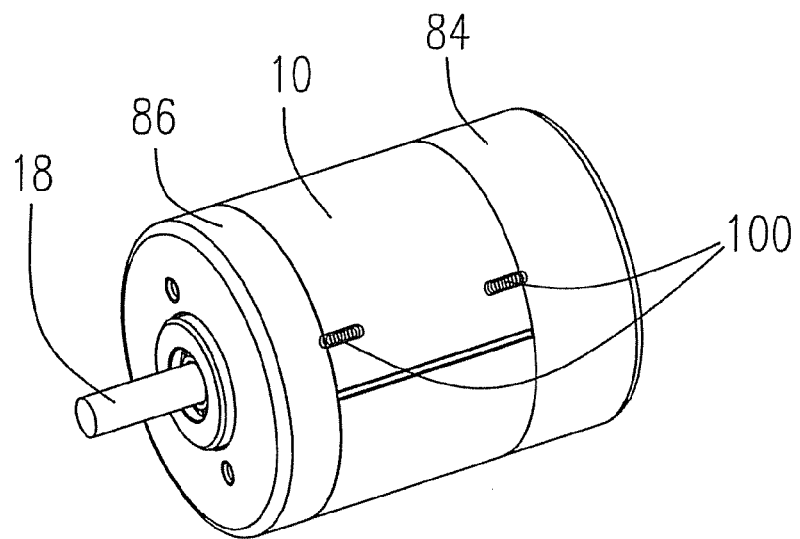
FIG. 7 shows an isometric side view of the electric machine of FIG. 6.
Figure 8:
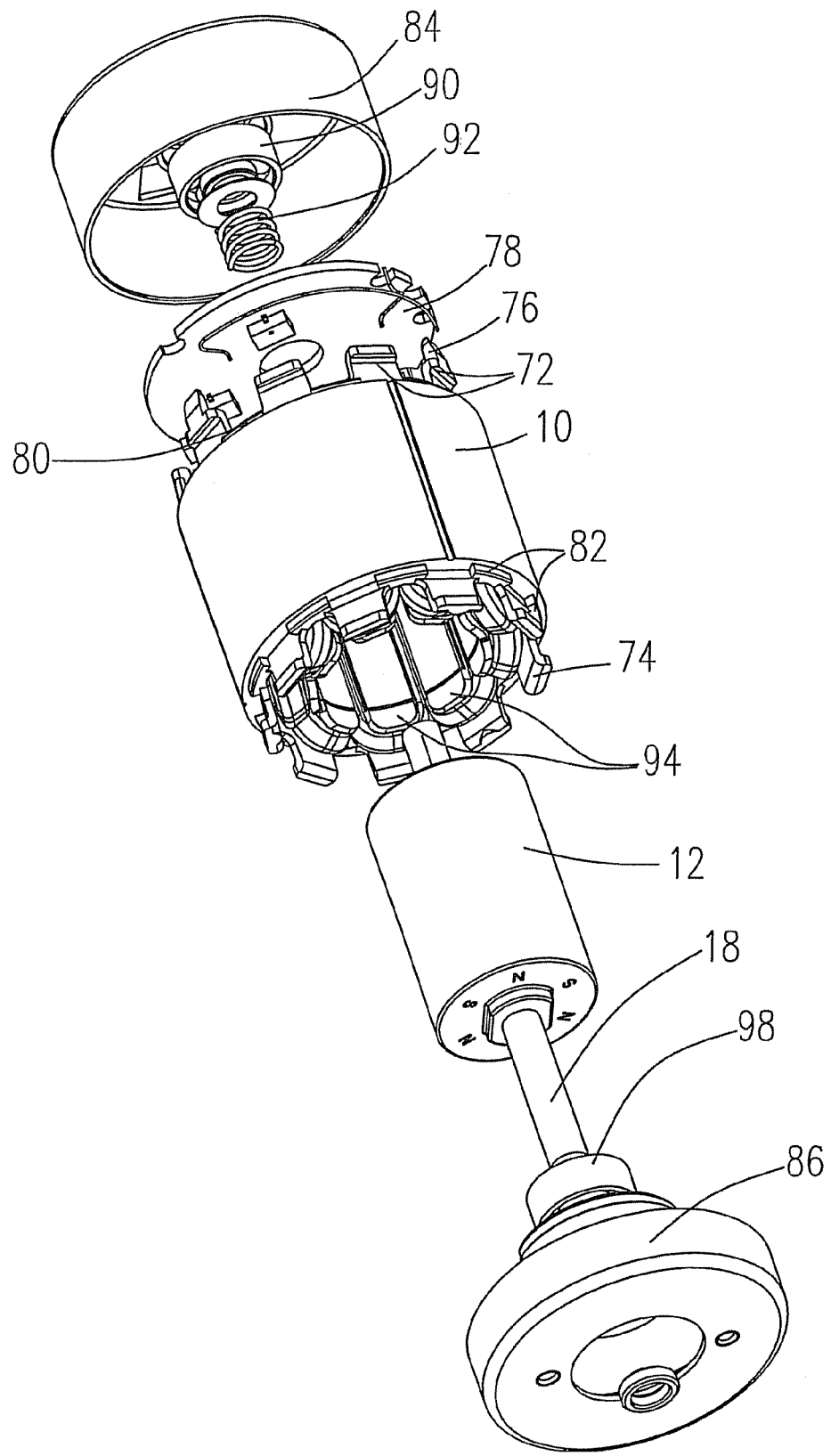
FIG. 8 shows an exploded view of the electric machine of FIG. 6.

A further embodiment of the invention is shown in FIGS. 6 to 8. As in the preceding embodiments, the machine comprises a stator 10 and a rotor 12 that is enclosed by the stator 10. The rotor 12 is mounted on a shaft 18. The stator 10 comprises a stator body 10c having a back yoke ring that defines the outside circumference of the stator 10, and stator slots and stator poles that are formed on the inside circumference of the back yoke ring and which receive a stator winding 20. The stator body 10 is made up of a plurality of stator laminations that are joined to form a lamination stack.

Slot insulation 38 is inserted into the slots of the stator 10, the slot insulation comprising a first and a second insulation member 68, 70. The insulation members 68, 70 are constructed in a similar way to the insulation member 42 of the previously described embodiment. They have wire guides 72, 74 for guiding and positioning the winding 20. Pins 76 are molded onto individual wire guides 72 of the insulation member 68 pointing away from the drive side of the electric machine, a circuit board 78 being centered to the slot insulation 38 and connected to it by means of these pins 76. The pins 76 may have locking lugs or some other means of fixing the circuit board 78 to the slot insulation 38. They may also be formed so as to facilitate connection to the circuit board 78 by hot caulking.

Projections 80, 82 are moreover integrally molded onto both insulation members 68, 70, the projections 80, 82 projecting outwards in a radial direction for the purpose of centering two flange components 84, 86. The flange components 84, 86 are cup-shaped in form and are slid from the two opposing end faces of the stator 10 in an axial direction over the insulation members 68, 70 until they come to lie at the end faces of the stator 10. At the same time, they are centered using the radial projections 80, 82. The flange component 84 is formed such that it also encloses the circuit board 78 carrying the components for the control and supply of the electric machine. A bearing support 88 for a ball bearing 90 for supporting the shaft 18 is integrated in the flange component 84. A spring 92 is used to preload the inner race of the ball bearing 90.

On the opposing drive side of the electric machine, radial inwardly projecting projections 94 for centering a bearing support 96 for a ball bearing 98 are integrally molded onto the insulation member 70.

The two flange components 84, 60 are fixed to the rotor 10 by means of laser welding, welding spots 100 being indicated in FIG. 7.

In the embodiment of FIGS. 6 to 8, the electric machine is accessible from both end faces after the stator has been wound, wherein the circuit board 28 can be simply mounted onto the pins 76 of the slot insulation and connected to the slot insulation. The circuit board 78, the bearings and the flange components are centered using the slot insulation, the flange components 84, 86 being simply slid from an end face in an axial direction over the slot insulation, so that they come to lie with their inner surfaces against the projections 80, 82. The slot insulation lies fully within the stator and the flange components, the housing of the electric machine being formed by the outer surface of the flange components and the outer surface of the stator. Welding the flange components to the stator, which may be provided as an alternative or in addition to the above described connecting methods, has the advantage that the flange component is simple to manufacture and that a reliable connection independent of the axial length of the flange component can be realized.

The described embodiment moreover has the advantage that the stator and rotor are directly centered using the slot insulation and not, as is usual in the prior art, using an additional housing, thus making it possible to shorten the tolerance chain.

Figure 9:
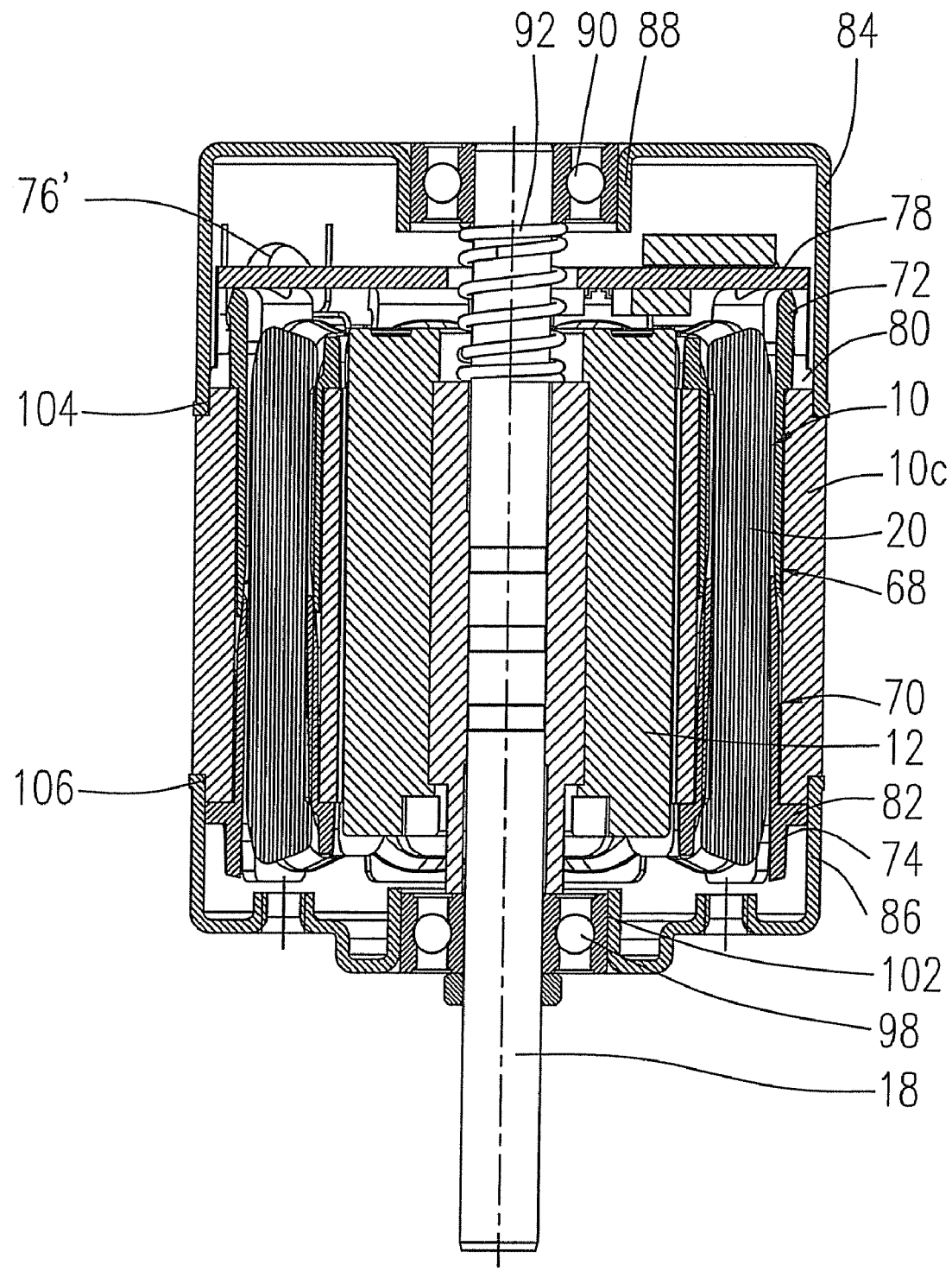
FIG. 9 shows a sectioned view through an electric machine according to yet another embodiment of the invention.
Figure 10:
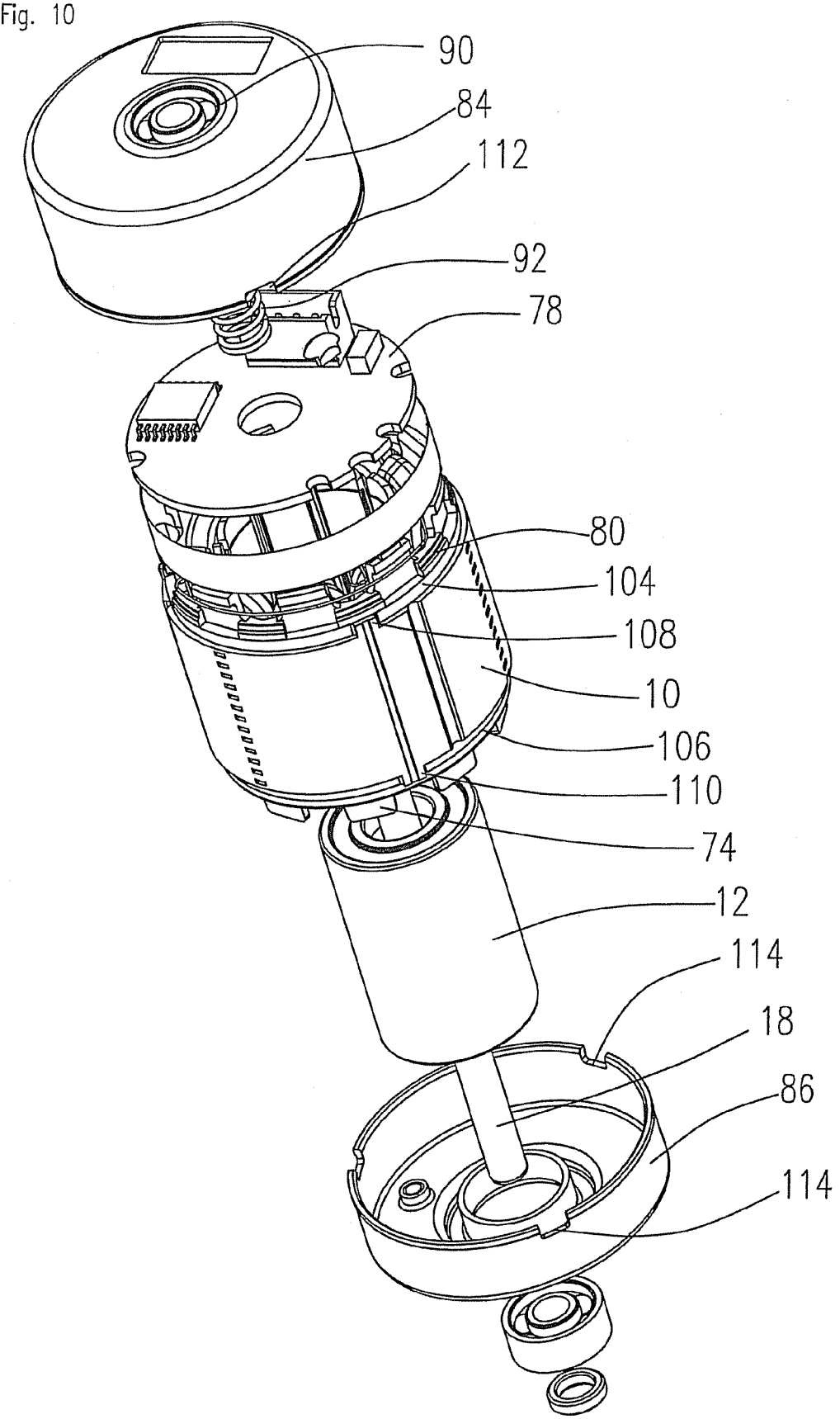
FIG. 10 shows an exploded view of the electric machine of FIG. 9.
Figure 11:
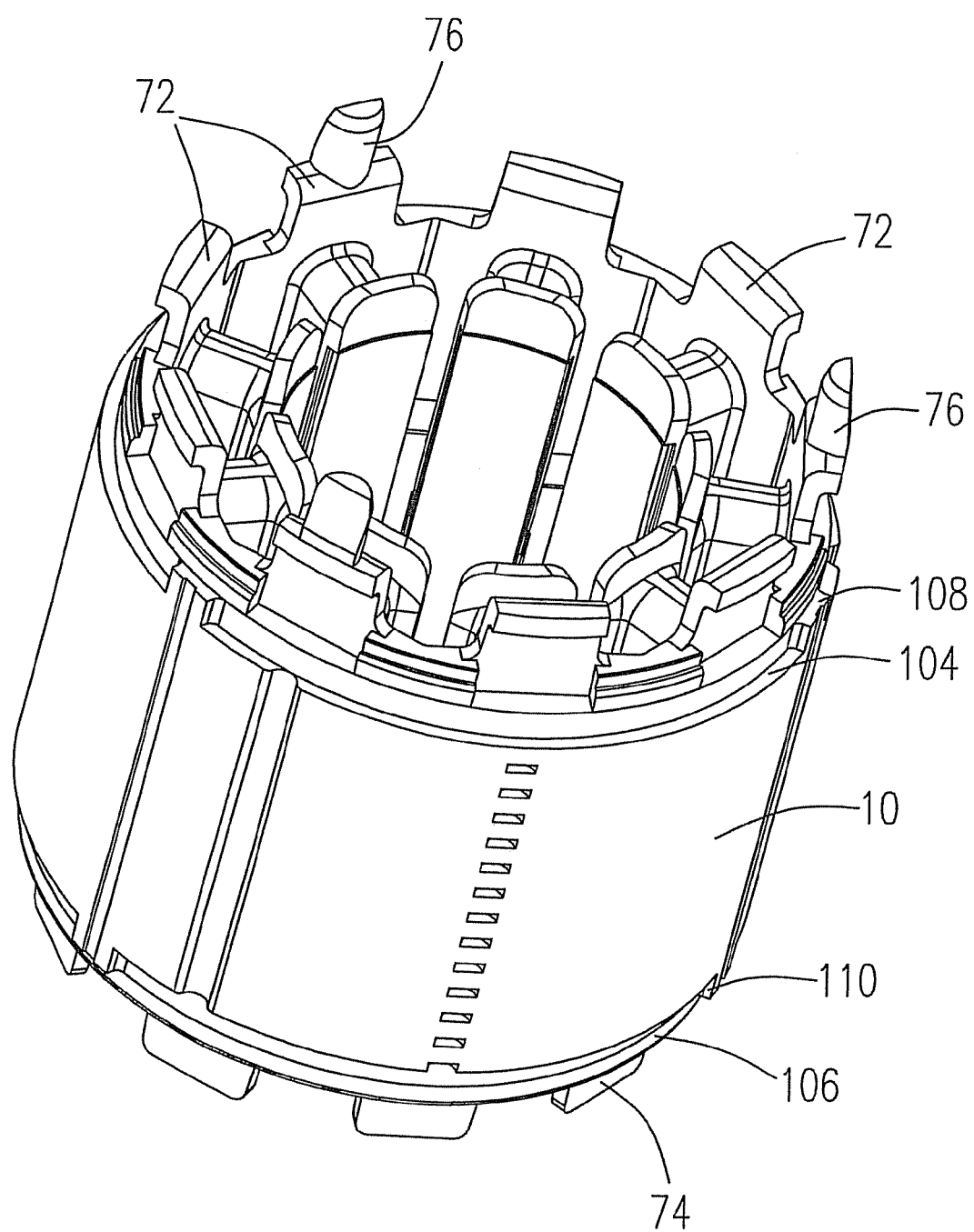
FIG. 11 shows an isometric view of the stator having slot insulation of the electric machine of FIG. 9.

Yet another embodiment of the invention is shown in FIGS. 9 to 11. This embodiment is similar to the embodiment of FIGS. 6 to 8, corresponding components being indicated by the same reference numbers and only the differences being described here.

In the embodiment of FIGS. 9 to 11 the insulation member 68, 70 differ only slightly from the preceding embodiment in that they do not abut flush with one another, but are tapered at the ends that are slid into the slots and overlap each other. Moreover, the wire guides 74 at the drive side of the machine are made straight. At the opposing end face, it can be seen in the view of FIG. 9 that the pins 76 formed on the wire guides 72 are connected to the circuit board 78 by hot caulking, so that domes 76' are produced that hold the circuit board 78 to the slot insulation.

The flange component 86 on tile drive side differs from the preceding embodiment in that a bearing support 102 is integrated in the component instead of a separate bearing support being provided. These modifications represent alternative embodiments to the characteristics of the electric machine according to the invention described previously without fundamentally changing the subject matter of the invention.

An important difference in the embodiment of FIG. 9 is that a step 104, 106 is formed in the outside circumference of the stator 10 at both its end faces, the flange components 84 or 86 respectively engaging with the step. These steps 104, 106 can be formed, for example, in that the respective outer layers of laminations in a stator lamination stack are given a smaller outside diameter. It is particularly advantageous if projections 108, 110 are left standing at intervals along the steps 104, 106, the projections 108, 110 interacting with corresponding recesses 112, 114 in the flange components 84 and 86. This makes it not only possible for the flange components 84, 86 to be centered on the stator with the aid of the slot insulation and the steps 104, 106, but also for their rotational position to be predetermined.

The projections 80, 82 of the slot insulation for centering the flange components 84, 86 are flush with the steps 104, 106 or even have a slightly larger outside diameter so as to ensure the centering of the flange components 84, 86 using the slot insulation. Since the slot insulation is made of plastics while the stator 10 and flange components 84, 86 are generally made of metal, this could optionally provide an additional clamping effect when the flange components are set flush on the stator step. The stator 10 and flange components 84, 86 may be connected to each other in the same way as in the preceding embodiment by laser welding, bonding or a similar method.

In the described embodiments, the flange components are centered with respect to the stator directly or by using the slot insulation, and the rotor is centered with respect to the stator via the flange components or directly using the slot insulation. The circuit board as well can be centered directly using the slot insulation. Compared to the prior art in which centering requires an additional housing, this method goes to shorten the tolerance chain. According to the invention, the slot insulation is moreover used to fix the flange components and/or the circuit board to the electric machine. The various characteristics of the slot insulation and other components of the electric machine used for centering and fixing that are described in the above embodiments may be used individually or in any combination.

The flange arrangement shown in the various embodiments may be combined with each other at the two end faces of the electric machine in any way whatsoever. The design of the slot insulation, adapted to the respective flange arrangements at the two end faces, may be the same or differ.

Figure 12A:
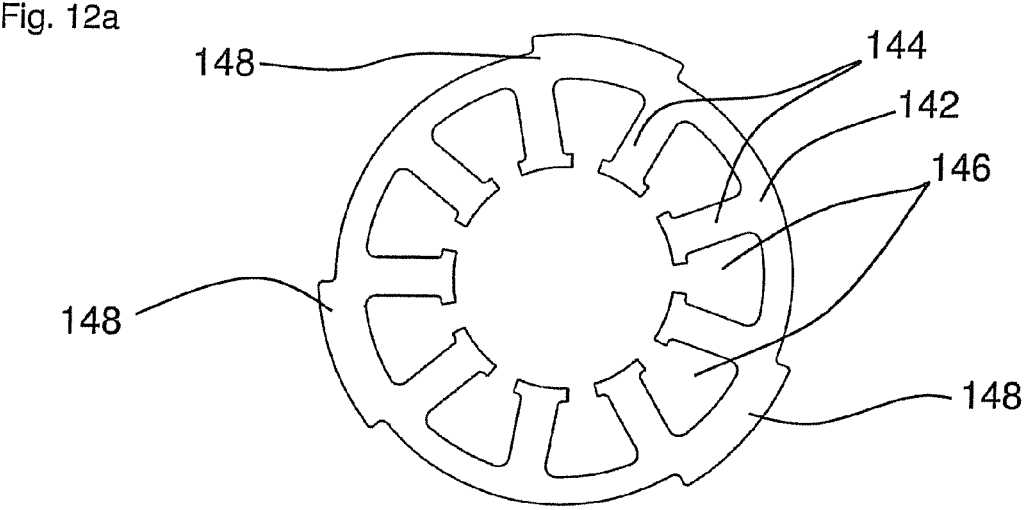
FIGS. 12a, 12b and 12c show views from above of individual stator laminations that are used to build up the stator according to the invention.

FIG. 12a shows a view from above of a lamination blank for forming the stator 10 according to the invention. The lamination blank comprises a back yoke ring 142 on whose inside surface stator poles 144 are disposed, as well as stator slots 146 located between the stator poles 144. In this respect, the lamination blank does not differ from a conventional stator blank for an inner rotor machine.

According to the invention, protrusions 148 are formed on the outside circumference of the individual stator laminations and thus on the outside circumference of the back yoke ring 142, the protrusions 148 being, in the preferred embodiment of the invention, formed as segments of a ring. In this application, however, all geometries in which parts protrude outwards from a cylindrical sleeve surface of the stator laminations are referred to as protrusions. Protrusions can thus be formed in that the outside contour of the stator laminations is given a polygon form or an irregular shape, so that parts of the stator laminations protrude from an originally cylindrical sleeve surface of the stator.

Figure 12B:
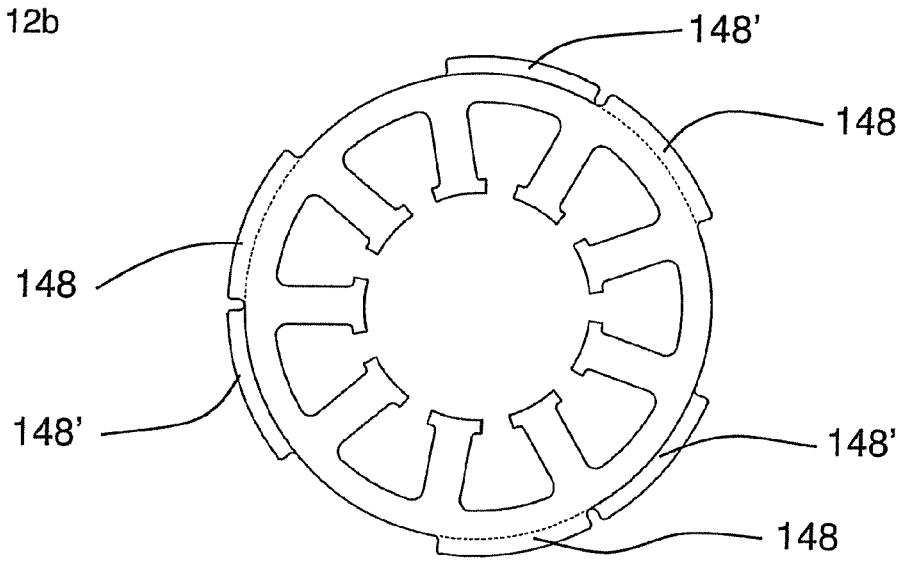
Figure 12C:
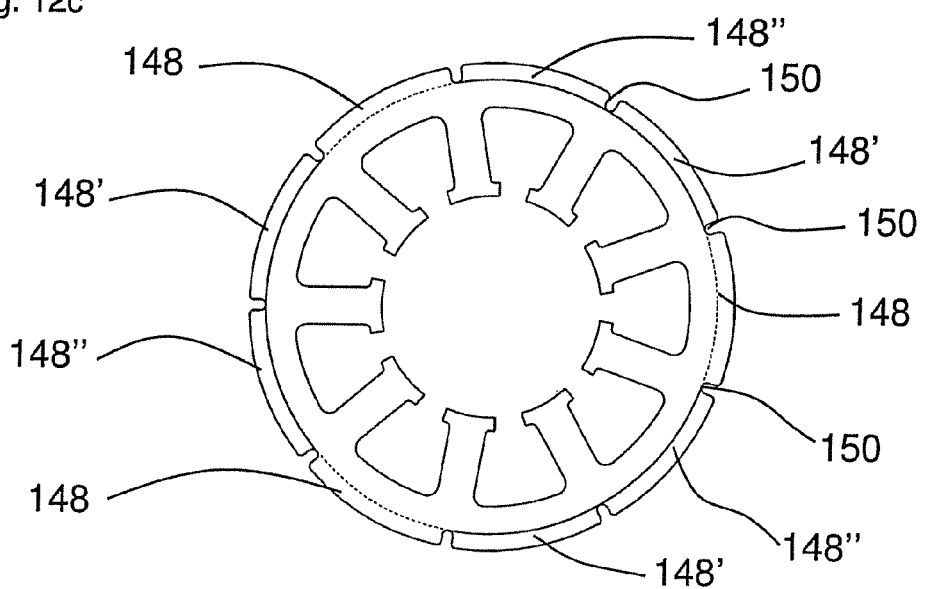

In the preferred embodiment of the invention, the stator laminations are formed with regularly disposed protrusions 148 shaped like segments of a ring, as illustrated in FIGS. 12a to 12c. In the case of the illustrated embodiment of a nine pole stator, three protrusions are formed on each stator lamination, it being expedient if the number of protrusions is an integral fraction (½, ⅓, ¼, . . . ) of the number of stator poles. The protrusions 148 are preferably disposed such that they also increase the size of the magnetic back yoke. For this purpose, the protrusions bridge at least one stator slot 146 between two adjacent poles 144.

In the illustrated embodiment, all the stator laminations have the same design and are stacked one on top of the other at an angular offset to one another, as shown in FIGS. 12b and 12c. The angular offset is an integral multiple of the pole pitch, so that the stator poles 144 are stacked in alignment with one another.

In FIGS. 12b and 12c, the protrusions of a first lamination are indicated by 148, the protrusions of the second lamination are indicated by 148', and the protrusions of the third lamination are indicated by 148', in order to make the relative positions of the protrusions clear.

Figure 13:
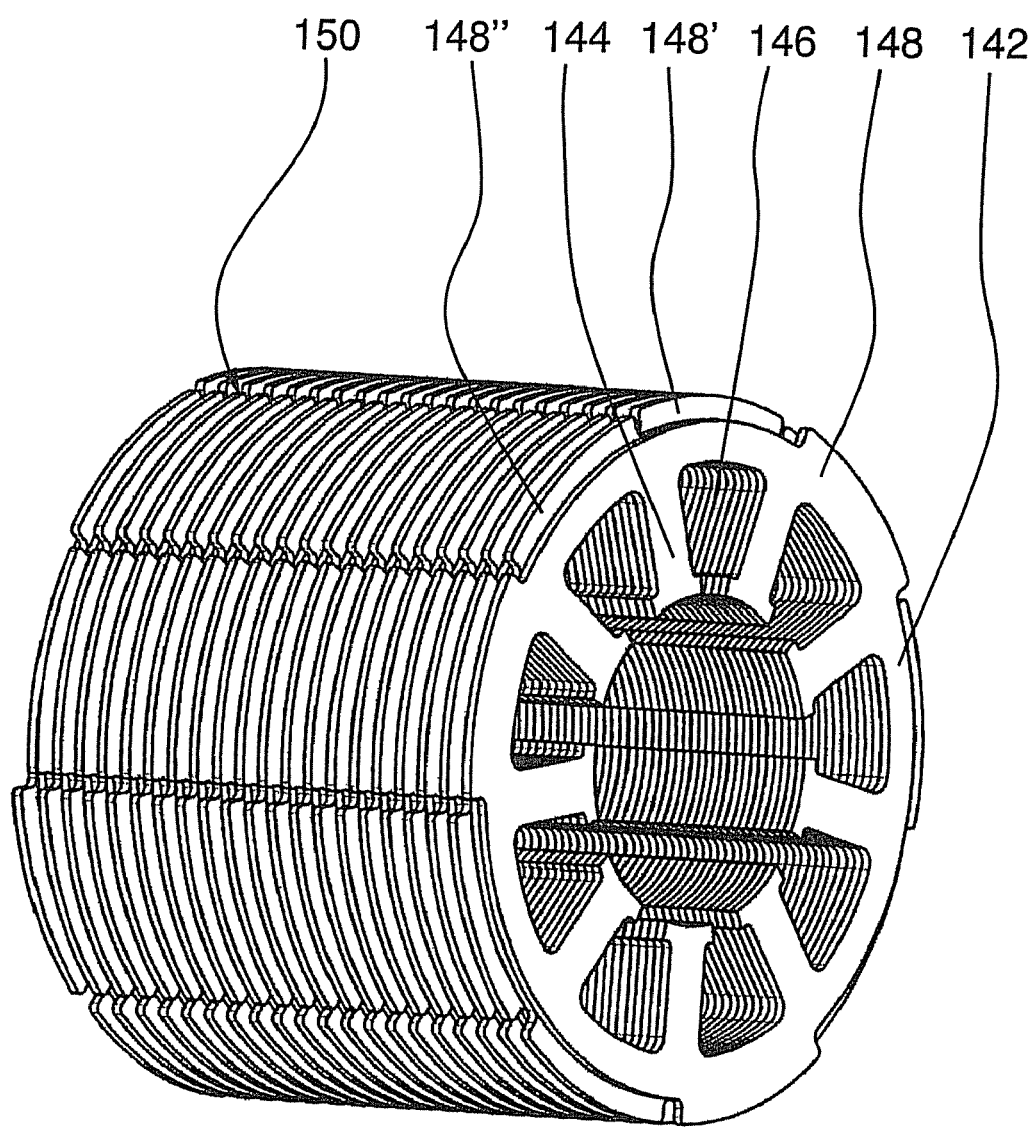
FIG. 13 shows a perspective view of the stator body that is used in the machine according to the invention.

FIG. 13 shows a stator construction for an electric machine according to the invention in which a plurality of laminations illustrated in FIGS. 12a to 12c are joined to form a stator body. It can be seen from FIG. 13 that through the protrusions 148, 148', 148" cooling fins are virtually formed on the outside surface of the stator, where two groups of aligned protrusions 148, 148', 148" are separated by channels 150 running lengthways. In projection, the protrusions 148, 148', 148" thus form a cylindrical sleeve surface of the stator body that is interrupted, however, by the channels 150 running lengthways.

Since the electric machine according to the invention is constructed such that the outside surface of the stator acts as a housing, the design of the stator laminations according to the invention make it possible to optimize the heat dissipation of the stator to the environment.

Compared to a cylindrical stator, the increase in surface area is approximately five to tenfold. The features revealed in the above description, the claims and the figures can be important for the realization of the invention in its various embodiments both individually and in any combination whatsoever.

What we claim is:

1. An electric machine having a rotor and a stator that encloses and houses the rotor, a slot insulation that is applied to the stator, and a flange arrangement positioned in an axial direction on at least one end face of the stator, wherein the slot insulation comprises slot insulating members, each of said slot insulating members including a flange part and a plurality of protrusions that are inserted into slots of the stator in an axial direction, and wherein the slot insulation has a means of centering the rotor and the flange arrangement with respect to the stator.

2. An electric machine according to claim 1, wherein the slot insulation has means of centering a bearing support for a rotor bearing.

3. An electric machine according to claim 1, wherein the flange arrangement has a bearing support for a rotor bearing.

4. An electric machine according to claim 1, wherein the slot insulation has a circumferential surface against which the flange arrangement comes to lie.

5. An electric machine according to claim 4, wherein the flange arrangement encompasses the slot insulation in the region of its circumferential surface.

6. An electric machine according to claim 1, wherein the slot insulation has pins for its attachment to the flange arrangement.

7. An electric machine according to claim 6, wherein the pins are designed to facilitate a connection using hot caulking.

8. An electric machine according to claim 1, wherein a step is formed at the outside circumference of the stator, the step interacting with the flange arrangement.

9. An electric machine according to claim 1, wherein the slot insulation has means of centering a circuit board that is disposed at the end face of the stator.

10. An electric machine according to claim 9, wherein the slot insulation and the circuit board are connected to each other using snap-in fasteners.

11. An electric machine according to claim 1, wherein the stator and the flange arrangement are connected by welding, particularly laser welding.

12. An electric machine according to claim 1, wherein the flange arrangement has a cup-shaped flange component that encompasses the slot insulation and is in contact with the stator.

13. An electric machine according to claim 1, wherein the flange arrangement has a first flange component that has a connecting surface which adjoins the end face of the stator and whose geometry is adapted to the geometry of the end surface of the stator, so that a stator winding, which is wound onto the stator and the adjoining connecting surface, connects the stator and the first flange component to each other.

14. An electric machine according to claim 13, wherein the first flange component is cup-shaped in form and the connecting surface forms the bottom of the cup.

15. An electric machine according to claim 14, wherein the flange arrangement has a second flange component that is formed as a cover for the first flange component and is connected to the first flange component.

16. An electric machine according to claim 15, wherein the first and the second flange component are caulked to one another.

17. An electric machine according to claim 13, wherein the connecting surface comes to lie between the slot insulation and the end face of the stator.

18. An electric machine according to claim 1, wherein a flange arrangement is disposed at both end faces of the stator, the flange arrangements at the two end faces being identical or varying in design, and the outside circumference of the flange arrangements is substantially flush with the outside circumference of the stator.

19. An electric machine according to claim 18, wherein the stator has a back yoke ring and stator slots and stator poles that are formed on the inside circumference of the back yoke ring and which receive the stator winding, and that the flange arrangements, together with the back yoke ring, form the housing of the electric machine.

20. An electric machine according to claim 1, wherein the flange arrangement adjoins the end face of the stator and the slot insulation lies within the flange arrangement.

21. An electric machine according to claim 1, wherein the slot insulation has a first and a second insulation member that is slid from opposing end faces of the stator into the stator slots.

22. An electric machine having:
   a rotor and a stator that encloses and houses the rotor; and
   first and second flange arrangements which are arranged at both end faces in an axial direction of the stator,
   wherein the stator comprises a back yoke ring and stator slots and stator poles that are formed on the inside circumference of the back yoke ring,
   wherein the flange arrangements, together with the back yoke ring, form the housing of the electric machine,
   wherein the stator is made up of a plurality of stator laminations that are joined to form a lamination stack, and
   wherein protrusions are formed on the outside circumference of the individual stator laminations and the stator laminations are disposed at an angular offset to one another, so as to increase the outside surface of the stator compared to a perfectly cylindrical outside surface.

23. An electric machine having a rotor and a stator that encloses and houses the rotor, a slot insulation that is applied to the stator, and a flange arrangement positioned in an axial direction on at least one end face of the stator,
   wherein the slot insulation comprises slot insulating members, each of said slot insulating members including a flange part and a plurality of protrusions that are inserted into slots of the stator in an axial direction, and
   where the slot insulation has a means of centering the rotor or the flange arrangement with respect to the stator.

24. The electric machine of claim 22 wherein the angular offset is an integral multiple of stator pole pitch.

* * * * *